United States Patent
Li

(10) Patent No.: US 11,800,506 B2
(45) Date of Patent: *Oct. 24, 2023

(54) METHOD FOR PERFORMING COMMUNICATION SERVICE BY USING PLURALITY OF MODEMS

(71) Applicant: Huawei Technologies Co., Ltd., Guangdong (CN)

(72) Inventor: Jifeng Li, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/817,709

(22) Filed: Aug. 5, 2022

(65) Prior Publication Data

US 2023/0031725 A1 Feb. 2, 2023

Related U.S. Application Data

(63) Continuation of application No. 17/121,614, filed on Dec. 14, 2020, now Pat. No. 11,438,895, which is a
(Continued)

(51) Int. Cl.
*H04W 72/04* (2023.01)
*H04W 72/0453* (2023.01)
*H04W 88/06* (2009.01)

(52) U.S. Cl.
CPC ........ *H04W 72/0453* (2013.01); *H04W 88/06* (2013.01)

(58) Field of Classification Search
CPC ............... H04W 72/04; H04W 72/044; H04W 72/0453; H04W 72/1205; H04W 72/1215; H04W 88/06

See application file for complete search history.

(56) References Cited

U.S. PATENT DOCUMENTS 9,203,665 B1 * 12/2015 Haran .................. H04L 27/12
11,252,724 B2 2/2022 Sung et al.
(Continued)

FOREIGN PATENT DOCUMENTS

CN 102123466 A 7/2011
CN 103582183 A 2/2014
(Continued)

OTHER PUBLICATIONS

Ou Weilai, Design and Implement of the Double Card Mobile Intelligent Switching System Based on Semantic, A Master Thesis Submitted to University of Electronic Science and Technology of China, May 2017, With an English Abstract, total 96 pages.
(Continued)

*Primary Examiner* — Siu M Lee
(74) *Attorney, Agent, or Firm* — WOMBLE BOND DICKINSON (US) LLP

(57) ABSTRACT

A first modem performs a first communication service in a first frequency band. A second modem performs a second communication service in a second frequency band. The first modem and the second modem are in a first operating mode. The first modem receives, from an access network device, a switching instruction for the first communication service, where the switching instruction is used to instruct the first modem to switch from the first frequency band to a third frequency band. The first modem indicates to an arbitration apparatus that the first modem needs to be switched to the third frequency band. The arbitration apparatus determines whether the third frequency band conflicts with the second frequency band, to perform: maintaining the first operating mode, or switching the first operating mode to a second operating mode for the first modem and the second modem.

10 Claims, 8 Drawing Sheets

Related U.S. Application Data continuation of application No. PCT/CN2018/093574, filed on Jun. 29, 2018.

(56) References Cited

U.S. PATENT DOCUMENTS

| | | | |
|---|---|---|---|
| 11,438,895 B2 * | 9/2022 | Li | H04W 72/0453 |
| 2012/0155381 A1 | 6/2012 | Ballantyne et al. | |
| 2013/0029720 A1 * | 1/2013 | Clevorn | H04B 1/401 |
| | | | 455/552.1 |
| 2013/0329639 A1 | 12/2013 | Wietfeldt et al. | |
| 2014/0066120 A1 | 3/2014 | Sharma et al. | |
| 2014/0213210 A1 | 7/2014 | Li et al. | |
| 2015/0139015 A1 | 5/2015 | Kadous et al. | |
| 2015/0264602 A1 | 9/2015 | Hageltorn et al. | |
| 2015/0327159 A1 | 11/2015 | Gude et al. | |
| 2016/0021660 A1 * | 1/2016 | Krishnamurthy | H04W 68/02 |
| | | | 455/452.1 |
| 2016/0105808 A1 * | 4/2016 | Song | H04W 52/288 |
| | | | 455/422.1 |
| 2016/0227557 A1 | 8/2016 | Fanous et al. | |
| 2016/0309407 A1 | 10/2016 | Ngai et al. | |
| 2016/0365626 A1 * | 12/2016 | Le Pennec | H01Q 1/34 |
| 2017/0086100 A1 * | 3/2017 | Sagar | H04W 36/0011 |
| 2017/0280380 A1 | 9/2017 | Gundu et al. | |
| 2019/0215783 A1 | 7/2019 | Chakraborty | |
| 2021/0068069 A1 | 3/2021 | Li | |

FOREIGN PATENT DOCUMENTS

| | | | |
|---|---|---|---|
| CN | 105519221 A | | 4/2016 |
| CN | 105611588 A | | 5/2016 |
| CN | 105682083 A | | 6/2016 |
| CN | 105916208 A | | 8/2016 |
| CN | 106130618 A | | 11/2016 |
| CN | 106412150 A | | 2/2017 |
| CN | 106465464 A | | 2/2017 |
| CN | 107994917 A | | 5/2018 |
| CN | 108540975 A | | 9/2018 |
| CN | 111903182 B | | 7/2021 |
| WO | 2016099786 A1 | | 6/2016 |
| WO | 2016131263 A1 | | 8/2016 |
| WO | 2017143609 A1 | | 8/2017 |
| WO | 2018102999 A1 | | 6/2018 |

OTHER PUBLICATIONS

Lalit Pathak et al, Protocol for Reduction in Network Resource Wastage for 4G Dual SIM Dual Standby User Equipment, 2018 15th IEEE Annual Consumer Communications and Networking Conference (CCNC), total 4 pages.

Tdoc RP-111637, Ericsson, Dual-SIM Dual-Standby UEs and their impact on the RAN, 3GPP TSG-RAN#54, Berlin, Germany, Dec. 6-9, 2011, total 3 pages.

3GPP TS 36.104 V15.2.0 (Mar. 2018),3rd Generation Partnership Project;Technical Specification Group Radio Access Network;Evolved Universal Terrestrial Radio Access (E-UTRA);Base Station (BS) radio transmission and reception (Release 12),total 279 pages.

3GPP TS 38.104 V15.1.0 (Mar. 2018),3rd Generation Partnership Project;Technical Specification Group Radio Access Network;NR;Base Station (BS) radio transmission and reception(Release 15), total 133 pages.

* cited by examiner

METHOD FOR PERFORMING COMMUNICATION SERVICE BY USING PLURALITY OF MODEMS

CROSS-REFERENCE TO RELATED APPLICATIONS

This application is a continuation of U.S. patent application Ser. No. 17/121,614, filed on Dec. 14, 2020, which is a continuation of International Application No. PCT/CN2018/093574, filed on Jun. 29, 2018. All of the afore-mentioned patent applications are hereby incorporated by reference in their entireties.

TECHNICAL FIELD

This application relates to the communications field, and in particular, to a method and an apparatus for performing a communication service by using a plurality of modems.

BACKGROUND

In real life, a growing quantity of users have more than one phone number. Terminal manufacturers launch dual-SIM terminals according to requirements of users, so that users can insert two subscriber identity modules (SIMs) from a same operator or different operators into a same terminal, and the two SIMs can be in a standby state at the same time.

Current terminal products may be classified into two types: dual SIM dual active products and dual SIM dual standby products. For a dual SIM dual active (DSDA) product, services on two SIMs can be performed at the same time. The services on the two SIMs are performed independently and do not affect each other. For a dual SIM dual standby (DSDS) product, due to a conflict between services on two SIMs at a radio frequency front end, the services on the two SIMs are performed in sequence. In other words, the services on the two SIMs are not performed at the same time due to the conflict. In a case of a conflict between the services on the two SIMs, the arbitration apparatus performs service preemption based on priorities of the services. A high-priority service may preempt a low-priority service, and the low-priority service can be performed only after the high-priority service ends. The current priorities of the services are as follows: a priority of a voice service>a priority of a data service.

Compared with the dual SIM dual standby product, the dual SIM dual active product has an advantage in services and user experience, but has a disadvantage in product costs. As shown in FIG. 1, FIG. 1 is a structural diagram of a dual SIM dual active system. FIG. 1 may include: a SIM 1, a SIM 2, a MODEM 1, a MODEM 2, a radio frequency integrated circuit RFIC 1, an RFIC 2, a radio frequency front end 1, and a radio frequency front end 2. The radio frequency front end 1 includes devices such as a filter and a power amplifier. The radio frequency front end 2 includes devices such as a filter and a power amplifier. As shown in FIG. 2, FIG. 2 is structural diagram of a dual SIM dual standby system. FIG. 2 may include: a SIM 1, a SIM 2, a MODEM 1, a MODEM 2, an arbitration apparatus, an RFIC, and a radio frequency front end. The radio frequency front end includes devices such as a filter and a power amplifier. It can be learned from the structural diagram of the dual SIM dual active system shown in FIG. 1 and the structural diagram of the dual SIM dual standby system shown in FIG. 2 that, the dual SIM dual active system requires two basically same RFICs, radio frequency front ends, and antennas to ensure that the radio frequency front ends for the services on the two SIMs do not conflict with each other. Therefore, compared with the dual SIM dual standby system, the dual SIM dual active system requires more radio frequency devices. In addition, a larger circuit board area needs to be occupied, posing a challenge to a structural design of a terminal product. In view of these factors, the dual SIM dual standby product has an advantage in costs.

A service procedure of the DSDS product is described as follows: On a terminal, a SIM card 1 of a user initiates a data service by using a modem MODEM 1. The MODEM 1 first applies to an arbitration apparatus for a data service resource. The arbitration apparatus determines whether a high-priority service is performed at this time; if no high-priority service is performed at this time, the arbitration apparatus returns an acknowledgment response to the MODEM 1. Then, the MODEM 1 starts to perform the data service. The service resource herein is a system resource required for performing a related service, and includes but is not limited to a radio frequency device, such as a radio frequency chip, a radio frequency front end device, or an antenna. A mobile terminated voice service is received or a mobile-originated voice service is initiated by using a modem MODEM 2 on a SIM card 2, and the MODEM 2 applies to the arbitration apparatus for a voice service resource. The arbitration apparatus determines that a low-priority service is being performed by using MODEM 1, and then initiates a preemption request to the MODEM 1. After the MODEM 1 releases the service resource such as a radio frequency front end, the arbitration apparatus returns an acknowledgment message to the MODEM 2. Then, the MODEM 2 starts to initiate the voice service. After the voice service on the MODEM 2 ends, the arbitration apparatus is notified to release the service resource. The arbitration apparatus notifies the MODEM 1 that the service resource of the MODEM 2 is unoccupied. After receiving the notification that the resource of the MODEM 2 is released, the MODEM 1 re-initiates a data service procedure.

It can be learned from the foregoing process, in a DSDS technology, when the data service of the MODEM 1 is preempted, the data service of the MODEM 1 is interrupted. In addition, when the voice service of the MODEM 1 is preempted, the MODEM 1 cannot receive or answer a call for a mobile terminated service. Consequently, the mobile terminated service is affected. Therefore, although the DSDS technology reduces costs, product performance deteriorates and the service resource is not fully utilized. In addition to a dual SIM application scenario, in other dual-MODEM operating scenarios, how to coordinate the dual MODEMs to improve service resource utilization becomes a problem.

SUMMARY

Embodiments of this application provide a method and an apparatus for performing a communication service by using a plurality of modems, to improve service resource utilization.

According to a first aspect of the embodiments of this application, a method for performing a communication service by using a plurality of modems is provided, and the method may include: A first modem MODEM 1 performs a first communication service in a first frequency band. A second modem MODEM 2 performs a second communication service in a second frequency band. The MODEM 1 and the MODEM 2 are in a first operating mode. A terminal moves, and then the MODEM 1 receives, from an access network device, a switching instruction for the first communication service, where the switching instruction is used to instruct the MODEM 1 to switch from the first frequency band to a third frequency band. For example, the access network device herein may include an evolved NodeB, a macro base station, a micro base station, a picocell base station, an access point, a transmission point, or the like. The MODEM 1 indicates to an arbitration apparatus that the MODEM 1 needs to be switched to the third frequency band. The arbitration apparatus determines whether the third frequency band conflicts with the second frequency band, to obtain a determining result. The arbitration apparatus performs one of the following operations based on the determining result: maintaining the first operating mode, or switching the first operating mode to a second operating mode for the MODEM 1 and the MODEM 2. One of the first operating mode and the second operating mode is a concurrent operating mode, and the other is a non-concurrent operating mode. For example, the concurrent operating mode may be a dual SIM dual active mode, and the non-concurrent operating mode may be a dual SIM dual standby mode.

In this embodiment of this application, by using the foregoing technical solution, the first operating mode may be maintained, or the first operating mode may be switched to the second operating mode based on whether frequency bands in which the MODEM 1 and the MODEM 2 perform respective services conflict. This improves service resource utilization.

Optionally, in some embodiments of this application, the first operating mode is the concurrent operating mode, the second operating mode is the non-concurrent operating mode, and that the arbitration apparatus performs one of following operations may include: when the determining result is that the third frequency band does not conflict with the second frequency band, the arbitration apparatus maintains the first operating mode. For example, when the third frequency band does not conflict with the second frequency band, the arbitration apparatus may maintain the dual SIM dual active mode. In this embodiment of this application, if the arbitration apparatus maintains the dual SIM dual active mode, it indicates that the first communication service on the MODEM 1 and the communication service on the MODEM 2 may be concurrently performed. This ensures normal execution of services on a plurality of SIMs on the terminal and therefore improves user experience.

Optionally, in some embodiments of this application, that the arbitration apparatus performs one of the following operations may further include: when the determining result is that the third frequency band conflicts with the second frequency band, the arbitration apparatus switches the first operating mode to the second operating mode for the MODEM 1 and the MODEM 2. For example, when the third frequency band conflicts with the second frequency band, the arbitration apparatus may switch from the dual SIM dual active mode to the dual SIM dual standby mode. In this embodiment of this application, the arbitration apparatus determines that the third frequency band conflicts with the second frequency band. To ensure that a high-priority service can be performed, the arbitration apparatus may switch from the dual SIM dual active mode to the dual SIM dual standby mode. Then, the arbitration apparatus initiates a preemption request based on priorities of the first communication service and the second communication service, to ensure proper running of one communication service and improve service resource utilization.

Optionally, in some embodiments of this application, the first operating mode is the non-concurrent operating mode, the second operating mode is the concurrent operating mode, and that the arbitration apparatus performs one of the following operations may include: when the determining result is that the third frequency band does not conflict with the second frequency band, the arbitration apparatus switches the first operating mode to the second operating mode for the MODEM 1 and the MODEM 2. For example, when the third frequency band does not conflict with the second frequency band, the arbitration apparatus may switch from the dual SIM dual standby mode to the dual SIM dual active mode. In this embodiment of this application, if the arbitration apparatus switches to the dual SIM dual active mode, it indicates that the first communication service on the MODEM 1 and the communication service on the MODEM 2 may be concurrently performed. This ensures normal execution of services on a plurality of SIMs on the terminal and therefore improves user experience.

Optionally, in some embodiments of this application, that the arbitration apparatus performs one of the following operations may further include: when the determining result is that the third frequency band conflicts with the second frequency band, the arbitration apparatus maintains the first operating mode. For example, when the third frequency band conflicts with the second frequency band, the arbitration apparatus may maintain the dual SIM dual standby mode. In this embodiment of this application, the arbitration apparatus determines that the third frequency band conflicts with the second frequency band. To ensure that a high-priority service can be performed, the arbitration apparatus initiates a preemption request based on priorities of the first communication service and the second communication service, to ensure proper running of one communication service and improve service resource utilization.

Optionally, in some embodiments of this application, the determining whether the third frequency band conflicts with the second frequency band may include: determining whether the third frequency band conflicts with the second frequency band according to a preset correspondence table, where the correspondence table is used to indicate a frequency band conflict status between the MODEM 1 and the MODEM 2. In this embodiment of this application, a specific implementation in which the arbitration apparatus determines whether the third frequency band conflicts with the second frequency band is provided, thereby improving feasibility of the solution.

Optionally, in some embodiments of this application, the frequency band conflict status includes: at least one of conflict frequency band information or non-conflict frequency band information of the MODEM 1 and the MODEM 2. In this embodiment of this application, the frequency band conflict status may include different possibilities, thereby increasing optionality of the solution.

Optionally, in some embodiments of this application, the MODEM 1 and the MODEM 2 in the concurrent operating mode use respective service resources, that is, respective radio frequency devices. In this embodiment of this application, the MODEM 1 and the MODEM 2 in the concurrent operating mode use respective radio frequency devices. This ensures that services can be normally performed on the MODEM 1 and the MODEM 2.

Optionally, in some embodiments of this application, one of the MODEM 1 and the MODEM 2 uses a millimeter-wave radio frequency device, and the other uses a non-millimeter-wave radio frequency device.

Optionally, in some embodiments of this application, the MODEM 1 and the MODEM 2 in the non-concurrent operating mode use a same radio frequency device in a preemption manner.

According to a second aspect of the embodiments of this application, an apparatus for performing a communication service by using a plurality of modems is provided, and the apparatus may include a first modem MODEM 1, a second modem MODEM 2, and an arbitration apparatus. The MODEM 1 is configured to: perform a first communication service in a first frequency band; receive, from an access network device, a switching instruction for the first communication service, where the switching instruction is used to instruct the MODEM 1 to switch from the first frequency band to a third frequency band; and indicate to the arbitration apparatus that the MODEM 1 needs to be switched to the third frequency band. The MODEM 2 is configured to perform a second communication service in a second frequency band, where the MODEM 1 and the MODEM 2 are in a first operating mode. The arbitration apparatus is configured to: determine whether the third frequency band conflicts with the second frequency band, to obtain a determining result; and perform one of following operations based on the determining result: maintaining the first operating mode, or switching the first operating mode to a second operating mode for the MODEM 1 and the MODEM 2, where one of the first operating mode and the second operating mode is a concurrent operating mode, and the other is a non-concurrent operating mode.

Optionally, in some embodiments of this application, the first operating mode is the concurrent operating mode, and the second operating mode is the non-concurrent operating mode. The arbitration apparatus is configured to: when the determining result is that the third frequency band does not conflict with the second frequency band, maintain the first operating mode.

Optionally, in some embodiments of this application, the arbitration apparatus is further configured to: when the determining result is that the third frequency band conflicts with the second frequency band, switch the first operating mode to the second operating mode for the MODEM 1 and the MODEM 2.

Optionally, in some embodiments of this application, the first operating mode is the non-concurrent operating mode, and the second operating mode is the concurrent operating mode. The arbitration apparatus is configured to: when the determining result is that the third frequency band does not conflict with the second frequency band, switch the first operating mode to the second operating mode for the MODEM 1 and the MODEM 2.

Optionally, in some embodiments of this application, the arbitration apparatus is further specifically configured to: when the determining result is that the third frequency band conflicts with the second frequency band, maintain the first operating mode.

Optionally, in some embodiments of this application, the apparatus further includes a memory. The memory is configured to store a correspondence table, where the correspondence table is used to indicate a frequency band conflict status between the MODEM 1 and the MODEM 2. The arbitration apparatus is configured to determine whether the third frequency band conflicts with the second frequency band according to the preset correspondence table.

Optionally, in some embodiments of this application, the frequency band conflict status includes: at least one of conflict frequency band information or non-conflict frequency band information of the MODEM 1 and the MODEM 2.

Optionally, in some embodiments of this application, the MODEM 1 and the MODEM 2 in the concurrent operating mode use respective radio frequency devices.

Optionally, in some embodiments of this application, one of the MODEM 1 and the MODEM 2 uses a millimeter-wave radio frequency device, and the other uses a non-millimeter-wave radio frequency device.

Optionally, in some embodiments of this application, the MODEM 1 and the MODEM 2 in the concurrent operating mode use a same radio frequency device in a preemption manner.

According to third aspect of the embodiments of this application, an apparatus for performing a communication service by using a plurality of modems is provided, and the apparatus includes a processor and a radio frequency device. The processor performs software code instructions to implement functions equivalent to those of the MODEM 1 module, the MODEM 2 module, and the arbitration apparatus module in the first aspect. In the third aspect, the MODEM 1 module, the MODEM 2 module, and the arbitration apparatus module are modules formed by a part of instructions in the software code instructions. The processor may implement the method in the first aspect by performing the software code instructions. Optionally, the radio frequency device includes at least one of a radio frequency chip circuit, a radio frequency front end, or an antenna. Optionally, as a service resource, the radio frequency device in a DSDS mode is managed by the arbitration apparatus module, and is preempted by the MODEM 1 module and the MODEM 2 module. Optionally, the apparatus further includes a memory, configured to store a preset correspondence table. Further, the memory is configured to store the software code instructions.

According to still another aspect of the embodiments of this application, a storage medium is provided. It should be noted that the technical solutions of this application essentially, or the part contributing to the prior art, or all or some of the technical solutions may be implemented in a form of a software product. The computer software product is stored in the storage medium, is configured to store a computer software instruction used by the foregoing terminal, apparatus, or processor, and includes a program designed for the terminal to perform the foregoing aspects.

According to still another aspect of the embodiments of this application, a computer program product including an instruction is provided. When the computer program product runs on a computer, the computer is enabled to perform the method according to any one of the foregoing aspects or the optional implementations of the aspects. The computer program product includes code used to form each part of the MODEM 1, the MODEM 2 and, the arbitration device in the first aspect.

The technical solutions provided in the embodiments of this application have following benefits: In the embodiments of this application, by using the foregoing technical solutions, concurrent execution and non-concurrent execution can be flexibly switched for services on the MODEM 1 and the MODEM 2 on the terminal. This improves service resource utilization.

DESCRIPTION OF EMBODIMENTS

The following describes the technical solutions in the embodiments of this application with reference to the accompanying drawings in the embodiments of this application. Certainly, the described embodiments are merely a part rather than all of the embodiments of this application. All other embodiments obtained by a person skilled in the art based on the embodiments of this application without creative efforts shall fall within the protection scope of this application.

Figure 1:
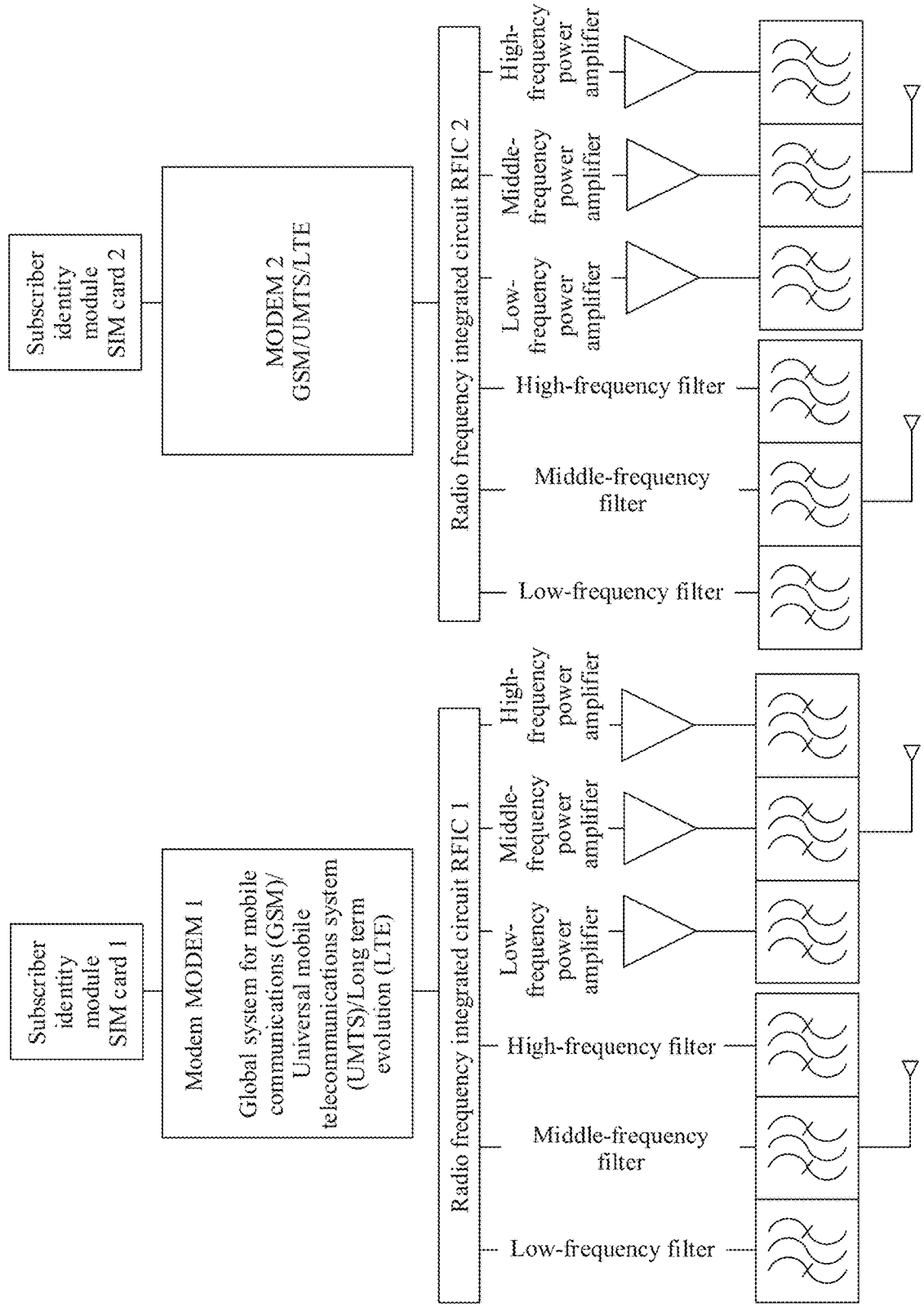
FIG. 1 is an architectural diagram of a system of a dual SIM dual active terminal.
Figure 2:
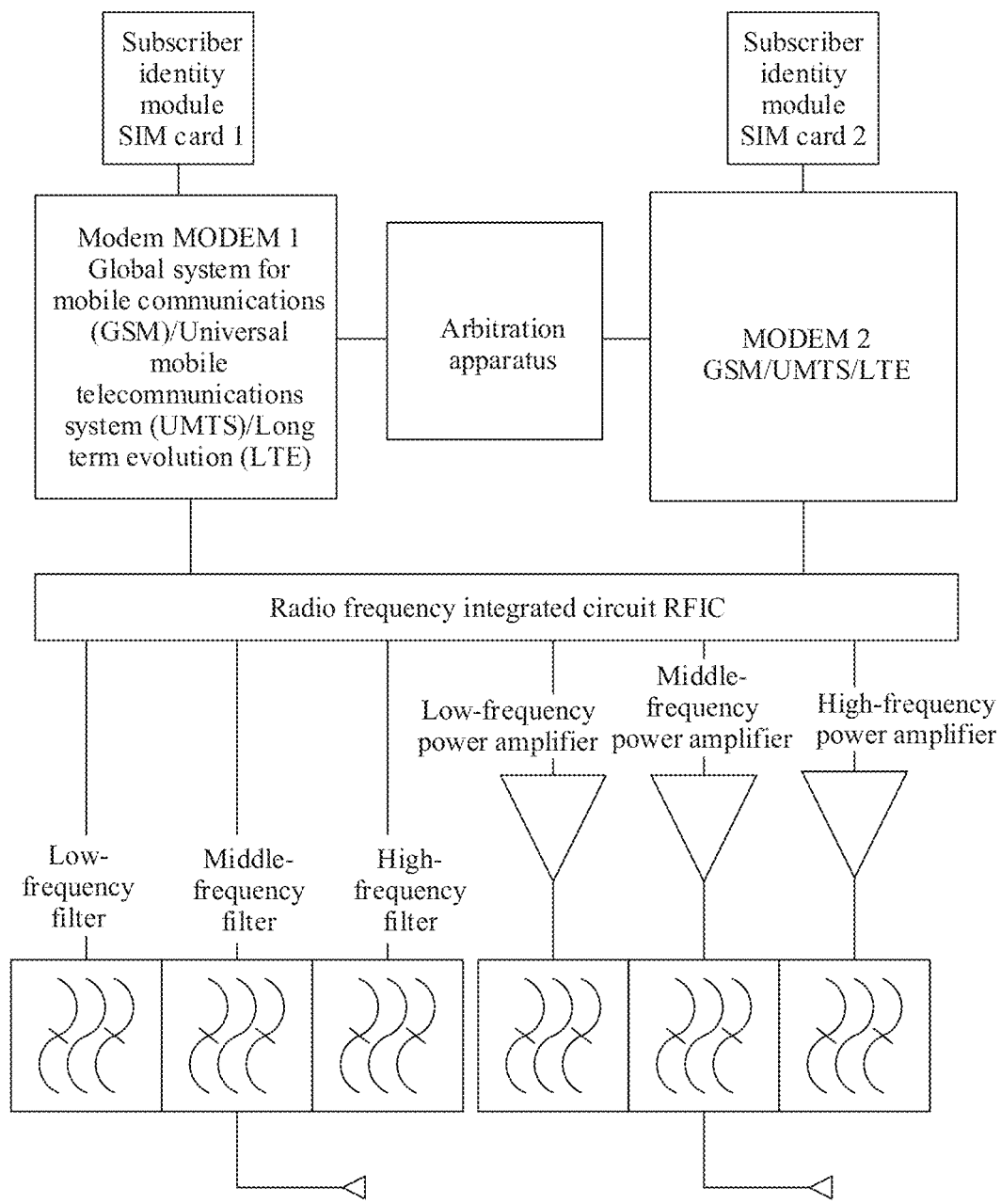
FIG. 2 is an architectural diagram of a system of a dual SIM dual standby terminal.
Figure 3:
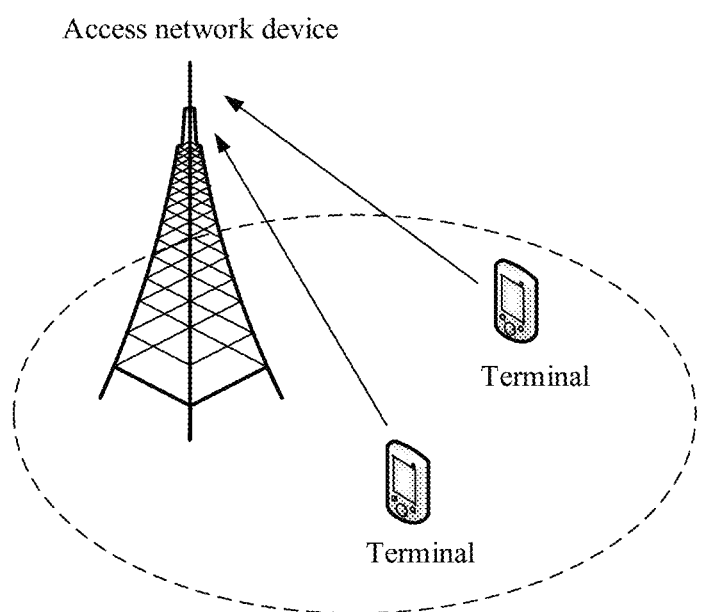
FIG. 3 is a diagram of an application scenario to which an embodiment of this application is applied.

A main application scenario of this application is shown in FIG. 3, and may include an access network device and a terminal.

The access network device may be an evolved NodeB (referred to as an eNB or an eNodeB for short), a macro base station, a micro base station (also referred to as a "small cell"), a picocell base station, an access point (AP), a transmission point (TP), a gNodeB (new generation NodeB), or the like in a long term evolution (LTE) system, a new radio (NR) system, or an licensed-assisted access long-term evolution (LAA-LTE) system in a radio access network (RAN).

The terminal may be referred to as a terminal device (UE), a mobile station (MS), a mobile terminal, an intelligent terminal, or the like. The terminal device may communicate with one or more core network devices through the radio access network. For example, the terminal devices may be mobile phones (or referred to as "cellular" phones), or computers with mobile terminals. The terminal devices may alternatively be portable, pocket-size, handheld, computer built-in, or in-vehicle mobile apparatuses, and terminal devices in a future NR network. The terminal devices exchange voice or data with the radio access network. A description of the terminal device is provided as follows: In this application, the terminal device may further include a relay, and a device that can perform data communication with a base station is considered as a terminal device.

Figure 4:
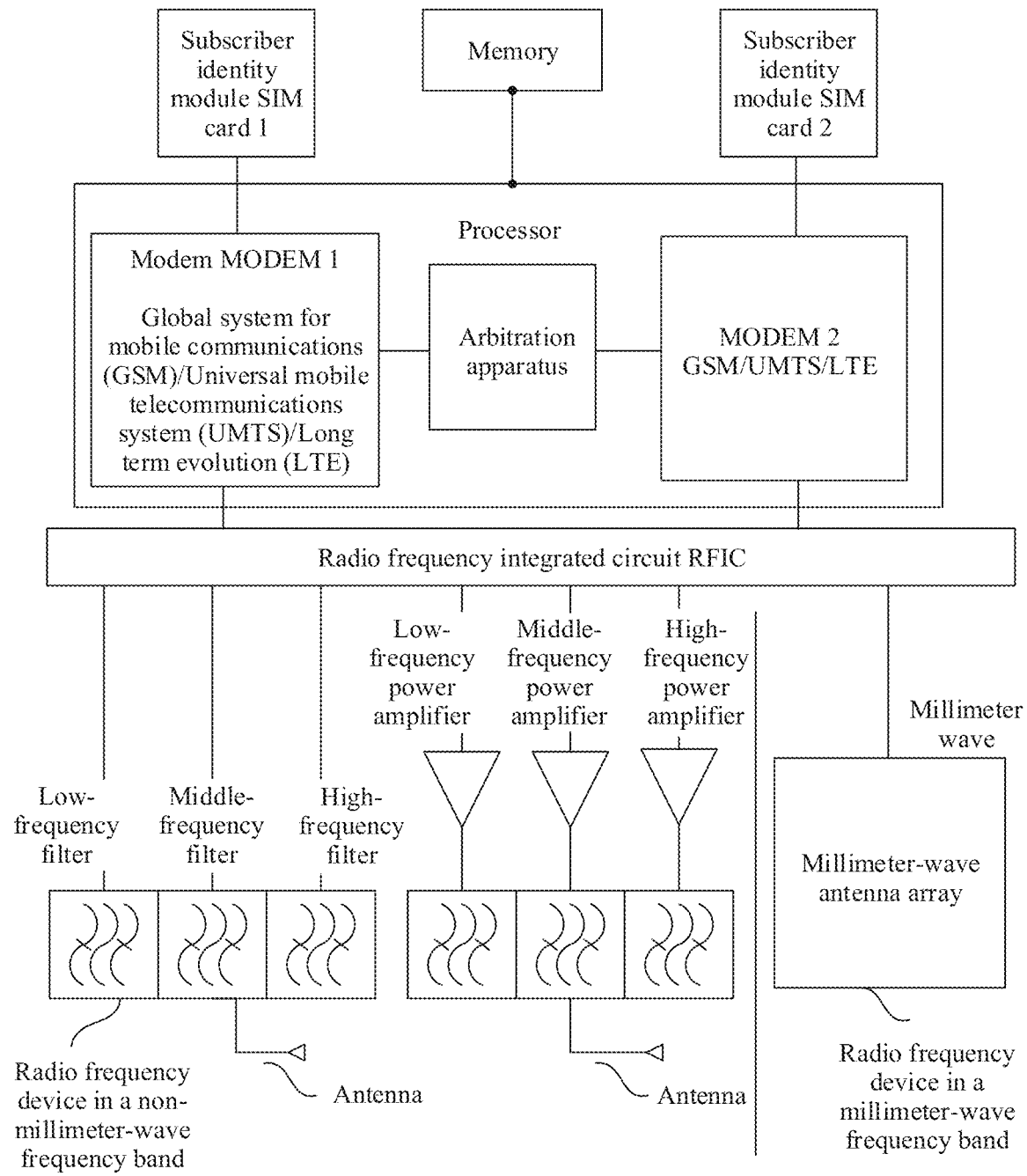
FIG. 4 is an architectural diagram of a system of an apparatus for performing a communication service by using a plurality of modems according to an embodiment of this application.

As shown in FIG. 4, FIG. 4 is an architectural diagram of a system of an apparatus for performing a communication service by using a plurality of MODEMs according to an embodiment of this application. The apparatus is included in a terminal, and the apparatus may include one or more chips, a large quantity of integrated circuits, transistors, logic gates, or the like. Therefore, the apparatus is an electronic device, and serves as a main body for implementing, in the terminal, a function of performing a communication service by using a plurality of MODEMs. In this embodiment of this application, as shown in FIG. 4, the dual SIM system may include a subscriber identity module (SIM) card 1, a SIM card 2, a MODEM 1, a MODEM 2, an arbitration apparatus, a radio frequency device, and a memory.

The radio frequency device may include a non-millimeter-wave radio frequency device and a millimeter-wave radio frequency device. For example, the non-millimeter-wave radio frequency device may be a radio frequency device operating in a sub-6 G frequency band, and the non-millimeter-wave radio frequency device operating in a sub-6 G frequency band may further be classified into a high-frequency radio frequency device, a middle-frequency radio frequency device, a low-frequency radio frequency device, and the like based on different frequency bands in which the radio frequency device operates. The specific division basis and criterion may be adjusted based on an actual requirement of a user. This is not specifically limited in this embodiment of this application. Each radio frequency device may include any one or a combination of a radio frequency chip circuit, a radio frequency front end, or an antenna. Each radio frequency device in FIG. 4 includes a combination of a radio frequency chip circuit, a radio frequency front end, and an antenna, to form an entire radio frequency system. The radio frequency chip circuit is mainly configured to implement a frequency mixing operation on a radio frequency signal, for example, up-conversion used for signal transmission or down-conversion used for signal reception. The radio frequency chip circuits included in a plurality of radio frequency devices may be combined together to form one or more integrated circuits, namely, radio frequency integrated circuits (RFIC). Each radio frequency chip circuit may further include an amplifier, a transformer, a digital-to-analog converter, an analog-to-digital converter, and the like. This is not limited in this embodiment. Each radio frequency front end may include a radio frequency amplifier such as a power amplifier or a low noise amplifier, and may further include various filters such as a duplexer, a band-pass filter, a band-stop filter, a high-pass filter, or a low-pass filter. The antenna may be used as a part of the radio frequency front end or as an independent component. For example, in FIG. 4, for the non-millimeter-wave radio frequency device, the antenna is a component different from the radio frequency front end. However, for the millimeter-wave radio frequency device, a radio frequency front end in the millimeter-wave radio frequency device may include a device integrating an amplifier, a filter, and an antenna. In other words, the antenna is built in the radio frequency front end. It may be understood that a radio frequency device corresponding to each frequency band may include one or more transmission paths and receiving paths. Each path is configured to transmit and process a signal, and may include devices from an antenna to an intermediate frequency (or baseband) circuit in a MODEM in a communications system. A signal is transmitted mainly in a form of a radio frequency signal between the antenna and the intermediate frequency circuit.

The MODEM in this embodiment, commonly referred to as a "modem", is a functional entity used for modulation and demodulation of a radio signal. MODEM is short for modulator and demodulator, and is configured to modulate a to-be-transmitted digital signal for transmission on a carrier or obtain a digital signal through demodulation from a carrier. At a transmit end, the modulator converts a digital signal into a signal recognizable to the radio frequency integrated circuit. At a receive end, the demodulator converts a signal generated by the radio frequency integrated circuit into a digital signal.

A SIM card is also referred to as a subscriber identity module card or a smart card, and is configured to store content such as user information, an encrypted key, and an address book of a user. The SIM card may be used in a wireless communications network to authenticate a user identity, and provide the key, so that the MODEM encrypts voice information for the user during a call.

The arbitration apparatus is generally a function program/module or a software algorithm running on a processor, and may alternatively be used as an independent hardware apparatus. The arbitration apparatus manages and allocates service resources based on input radio frequency usage information and service information of the modem. When the apparatus in this embodiment is in a DSDS mode, the two MODEMs need to request service resources from the arbitration apparatus in a preemption manner, and then the arbitration apparatus manages and allocates a same set of shared service resources for the two MODEMs. Only one MODEM can obtain a right to use the service resources at a time, the other modem needs to wait. When the apparatus in this embodiment is in the DSDA mode, the two MODEMs can operate concurrently, and the arbitration apparatus allocates different service resources to the two MODEMs. The service resource in this embodiment is also referred to as a radio frequency resource, namely, the radio frequency device mentioned above. The radio frequency device includes but is not limited to at least one of a radio frequency chip circuit, a radio frequency front end, or an antenna. The arbitration apparatus manages operating modes of the two MODEMs by allocating and managing the right to use the radio frequency device for the two MODEMs, so that the DSDS mode and the DSDA mode can be switched from each other for the two MODEMs.

The arbitration apparatus, the two MODEMs, the SIM card, the radio frequency device, and the memory mentioned above may use respective different hardware apparatuses. The arbitration apparatus and the two MODEMs may be integrated together. Alternatively, the arbitration apparatus and the two MODEMs may be partially implemented by a software and run on a processor, as shown in a box in FIG. 4. The processor runs a software code program or an instruction to form the arbitration apparatus and the two MODEMs. In this case, the arbitration apparatus and the two MODEMs are different software modules. The processor is a control center of the communications apparatus in the terminal, and connects all parts of the entire apparatus or terminal by using various interfaces and lines. The processor performs various functions of the terminal and processes data by running or performing a software program and/or a module stored in the memory and invoking data stored in the memory, to perform overall monitoring on the terminal. The processor may include one or more chips. In this embodiment, the RFIC may be integrated with the processor to serve as a complete chip. Alternatively, the RFIC is an independent chip or a plurality of chips. The memory is usually a device located outside the processor.

Optionally, the processor may include one or more processing units. Optionally, an application processor and a modem processor may be integrated into the processor. The modem processor and a part of a peripheral circuit may be combined to form the MODEM mentioned above. The application processor mainly processes an operating system, a user interface, an application program, and the like. The modem processor mainly processes wireless communication. It may be understood that the modem processor may alternatively not be integrated into the processor.

With reference to FIG. 4, the arbitration apparatus in FIG. 4 and each MODEM each may be an independent hardware device, and each perform a respective function. Alternatively, the arbitration apparatus and each MODEM may be software modules running on the processor, that is, exist in a form of software code. Alternatively, the arbitration apparatus and each MODEM may be implemented by a combination of software and hardware. The software is a functional module formed by software code run by the processor, and the hardware is a dedicated hardware circuit, including but not limited to a dedicated integrated circuit, a logic gate, an algorithm circuit, or an FPGA (field programmable gate array) circuit.

The memory may be configured to store a software program and a module. The processor performs various functions and applications of the terminal and processes data by running the software program and the module stored in the memory. The memory may mainly include a program storage area and a data storage area. The foregoing storage areas each may correspond to one or more respective memories. In other words, there may be a plurality of memories. One memory may contain a plurality of memories, and the memories may store different content. The program storage area may store an operating system, an application program required by at least one function (for example, a voice playing function and an image playing function), and the like. The data storage area may store data (for example, audio data and an address book) and the like created based on use of a mobile phone. In addition, the memory may include at least one of a high-speed random access memory, a read-only memory, or a volatile memory, and may alternatively include a non-volatile memory, for example, include at least one magnetic disk storage device, a flash memory device, or another volatile solid-state storage device.

It may be understood that, the MODEM 1, the MODEM 2, and the arbitration apparatus may be integrated in one processor for implementation, or each may be implemented as a single processor to separately perform respective software code, instead of being separately stored in different memories. When the foregoing MODEM 1, MODEM 2, and arbitration apparatus are implemented by using software code, main functions of the apparatus in this embodiment may be considered to be implemented by using software.

In this embodiment of this application, a non-millimeter-wave frequency band radio frequency front end and a millimeter-wave frequency band radio frequency front end are independent of each other. The MODEM 1 supports a global system for mobile communications (GSM), a universal mobile telecommunications system (UMTS), long term evolution (LTE), and a NR access standard that used for a millimeter-wave frequency band. The MODEM 2 supports the GSM, the UMTS, and the LTE access standard, but does not support the millimeter-wave frequency band.

Optionally, types of access standards supported by each MODEM may be extended or lessened. The MODEM 1 supports the NR, and the MODEM 2 does not support the NR. In other words, in this embodiment, the NR access standard is supported only by one MODEM, and the other MODEM operates only in a non-millimeter-wave operating band. The NR access standard may support operating in a non-millimeter-wave operating band and a millimeter-wave frequency band.

The following may further describe the technical solutions of this application by using embodiments. An example in which a concurrent operating mode is the DSDA mode and a non-concurrent operating mode is the DSDS mode is used for description. The concurrent operating mode means that services of a plurality of MODEMs can be performed at the same time. The non-concurrent operating mode means that the services of the plurality of MODEMs are performed by preempting a service resource, that is, the services of the plurality of MODEMs cannot be performed at the same time.

1. A DSDA mode is switched to a DSDS mode for services on two SIMs.

Figure 5:
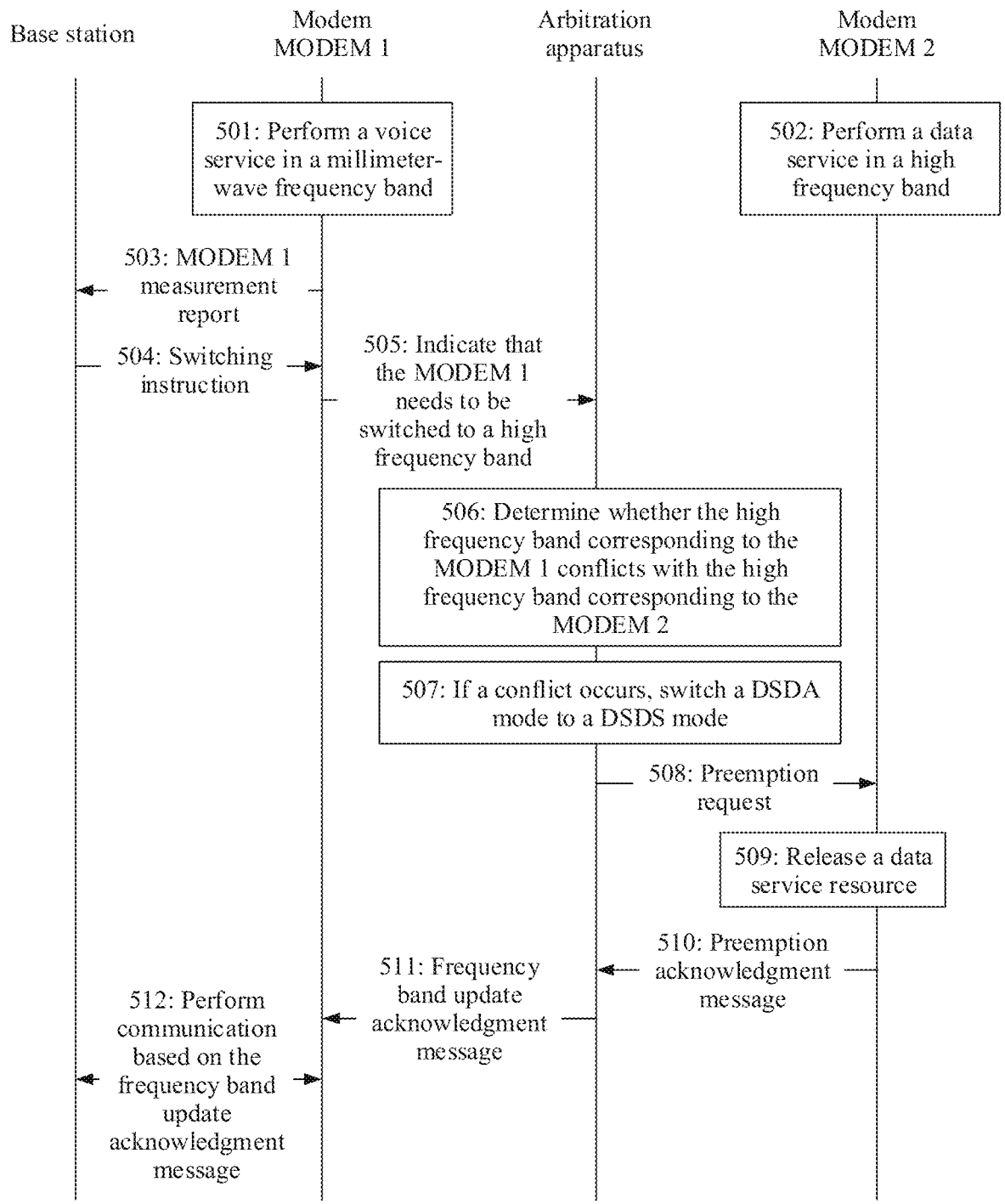
FIG. 5 is a schematic diagram of a method for performing a communication service by using a plurality of modems according to an embodiment of this application.

FIG. 5 is a schematic diagram of a method for performing a communication service by using a plurality of modems according to an embodiment of this application. 501: A first modem MODEM 1 performs a voice service in a millimeter-wave frequency band, that is, occupies a radio frequency device, namely, a service resource, corresponding to the millimeter-wave frequency band. For example, before the MODEM 1 performs the voice service in the millimeter-wave frequency band, the MODEM 1 receives a voice service request. For example, the MODEM 1 generates the voice service request in response to an operation of a user, or the MODEM 1 receives the voice service request sent by a software program or the like. Then, the MODEM 1 sends a voice service resource request to an arbitration apparatus based on the voice service request, where the voice service resource request carries information about the millimeter-wave frequency band. The arbitration apparatus determines, based on the information about the millimeter-wave frequency band and according to a preset correspondence table, that the information about the millimeter-wave frequency band does not conflict with information about a frequency band corresponding to another communication service on a terminal. In this case, the arbitration apparatus returns a first acknowledgment response to the MODEM 1. The MODEM 1 establishes the voice service based on the first acknowledgment response.

It should be noted that, that the MODEM 1 performs a first communication service on the millimeter-wave frequency band may be understood as that the MODEM 1 camps on the millimeter-wave frequency band, and may be in two statuses: waiting to process the voice service (waiting to send or receive a voice signal) and transmitting the voice service (sending or receiving a voice signal). Execution of the communication service in operation 501 is performing transmission and reception, namely, voice sending and receiving. Optionally, when the arbitration apparatus receives the voice service resource request, if the arbitration apparatus determines that there is no communication service being performed, the arbitration apparatus may also return a first acknowledgment response to the MODEM 1. The preset correspondence table is used to indicate a frequency band conflict status between the MODEM 1 and a MODEM 2. The frequency band conflict status includes: at least one of conflict frequency band information or non-conflict frequency band information of the MODEM 1 and the MODEM 2.

502: The second modem MODEM 2 performs a data service in a high frequency band, that is, occupies a radio frequency device, namely, a service resource, corresponding to the high frequency band. The MODEM 1 and the MODEM 2 are in a DSDA mode. For example, before the MODEM 2 performs the data service in the high frequency band, the MODEM 2 receives a data service request. For example, the MODEM 2 generates the data service request in response to an operation of the user, or the MODEM 2 receives the data service request sent by a software program or the like. Then, the MODEM 2 sends a data service resource request to the arbitration apparatus based on the data service request, where the data service resource request carries information about the high frequency band. The arbitration apparatus determines, based on the information about the high frequency band and according to the preset correspondence table, that the information about the high frequency band does not conflict with information about a frequency band corresponding to another communication service on the terminal. In this case, the arbitration apparatus returns a second acknowledgment response to the MODEM 2. The MODEM 2 establishes the data service based on the second acknowledgment response.

It should be noted that, that the MODEM 2 performs a second communication service in the high frequency band may be understood as that the MODEM 2 camps on the high frequency band, and is in two statuses: waiting to send or receive data, and sending or receiving data. Execution of the communication service in operation 502 is about sending or receiving data. In other words, the MODEM 2 and the MODEM 1 perform execution concurrently. Optionally, when the arbitration apparatus receives the data service resource request, if the arbitration apparatus determines that there is no communication service being performed, the arbitration apparatus may also return a second acknowledgment response to the MODEM 2.

It may be understood that, that the MODEM performs the communication service may be directly sending or receiving data information, control information, or the like, and may alternatively be in a standby state, for example, waiting for sending or receiving data. Therefore, the execution of the communication service in this embodiment includes two cases: sending and receiving a service, and waiting to send and receive a service. When execution of the two communication services is about sending and receiving, the MODEM 1 and the MODEM 2 enter a concurrent state. If execution of at least one communication service is waiting, the MODEM 1 and the MODEM 2 enter a non-concurrent state. Operation 501 and operation 502 are not limited to a time sequence.

If the frequency band corresponding to the MODEM 1 is a millimeter-wave frequency band, and the millimeter-wave frequency band corresponding to the MODEM 1 does not conflict with a non-millimeter-wave frequency band corresponding to the MODEM 2. In this way, it can be ensured that communication services on the MODEM 1 and the MODEM 2 are performed concurrently. This effectively utilizes service resources and improves user experience. In this embodiment and subsequent embodiments, one MODEM performs a communication service in two statuses, that is, waiting to send or receive a service, and send or receive a service. Therefore, when two MODEMs perform respective communication services, if the two MODEMs both perform transmission and reception, the two MODEMs are in a concurrent operating mode. On the contrary, if only one of the two MODEMs performs transmission and reception, and the other MODEM is waiting for sending and receiving. Alternatively, both the MODEMs are waiting for sending and receiving, the two MODEMs are in a non-concurrent operating mode, that is, the two MODEMs are not in a status of performing service sending and receiving at the same time.

503: When the terminal moves, the MODEM 1 of the terminal sends a MODEM 1 measurement report to a base station. For example, when using the terminal, the user may move, and the MODEM 1 of the terminal sends the MODEM 1 measurement report to the base station. It should be noted that the MODEM 2 of the terminal may also send a MODEM 2 measurement report to the base station. Herein, that the MODEM 1 sends the MODEM 1 measurement report to the base station is used as an example for description.

504: The MODEM 1 receives, from the base station, a switching instruction for the voice service, where the switching instruction is used to instruct the MODEM 1 to switch from the millimeter-wave frequency band to a high frequency band. For example, the base station sends the switching instruction for the voice service to the MODEM 1 based on the MODEM 1 measurement report. The switching instruction is used to instruct the MODEM 1 to switch from the millimeter-wave frequency band to a high frequency band. In other words, the switching instruction is used to instruct the MODEM 1 to switch from an original cell to a target cell.

505: The MODEM 1 indicates to the arbitration apparatus that the MODEM 1 needs to be switched to a high frequency band. For example, the MODEM 1 may send an indication message to the arbitration apparatus, where the indication message may indicate that the MODEM 1 needs to be switched to a high frequency band. Actually, operating frequency bands of each MODEM have a different possible combination. In this embodiment, that the MODEM 1 is switched from the millimeter-wave frequency band to a high frequency band is merely used as an example for description, but not used for limitation.

506: The arbitration apparatus determines whether the high frequency band corresponding to the MODEM 1 conflicts with the high frequency band corresponding to the MODEM 2. The arbitration apparatus or the memory stores the preset correspondence table, where the preset correspondence table is used to indicate a frequency band conflict status between the MODEM 1 and the MODEM 2. The frequency band conflict status includes: at least one of conflict frequency band information or non-conflict frequency band information of the MODEM 1 and the MODEM 2.

For example, it can be learned from FIG. 4 that if the NR access standard supported by the MODEM 1 supports operating in a millimeter-wave frequency band, and a service of the MODEM 2 operates in a non-millimeter-wave frequency band, no conflict occurs when services of the two SIMs use service resources. In this case, the services can be performed concurrently. In addition, if the MODEM 1 operates in a high frequency band, and the MODEM 2 operates in a middle frequency or a low frequency, no conflict occurs when the services of the two SIMs use radio frequency front ends. In this case, the services can be performed concurrently. Therefore, a preset correspondence table, for example, a table of frequency bands that do not conflict and that are corresponding to the two MODEMs, as shown in Table 1 below, may be pre-established on the arbitration apparatus.

TABLE 1

| MODEM 1 | MODEM 2 | Whether radio frequency front ends conflict |
| --- | --- | --- |
| Millimeter-wave frequency band | High frequency band | Frequency bands that do not conflict |
| Millimeter-wave frequency band | Middle frequency band | Frequency bands that do not conflict |
| Frequency bands that do not conflict | Low frequency band | Frequency bands that do not conflict |
| High frequency band | Middle frequency | Frequency bands that do not |

TABLE 1-continued

| MODEM 1 | MODEM 2 | Whether radio frequency front ends conflict |
| --- | --- | --- |
| | band | conflict |
| High frequency band | Low frequency band | Frequency bands that do not conflict |
| Middle frequency band | High frequency band | Frequency bands that do not conflict |
| Middle frequency band | Low frequency band | Frequency bands that do not conflict |
| Low frequency band | High frequency band | Frequency bands that do not conflict |
| Low frequency band | Middle frequency band | Frequency bands that do not conflict |

For example, low frequency bands may include frequency bands (BAND): B5, B8, . . . (sub-1 G frequency bands); middle frequency bands may include BANDs: B1, B2, . . . (1 G to 2 G frequency bands); high frequency bands may include BANDs: B40, B41, . . . (2 G to 6 G frequency bands); and millimeter-wave corresponds to BANDs above 6 G. The foregoing correspondences between frequency bands may be configured by using a (non-volatile (NV)) entry in a configuration file. Configurations vary according to types of radio frequency front end modules of different products. The file shown in Table 1 is stored in a memory, and may be accessed by the arbitration apparatus.

In the foregoing example, the table of frequency bands that do not conflict indicates frequency bands that do not conflict and that are corresponding to different MODEMs. Optionally, the arbitration apparatus may also establish a table of frequency bands that conflict, that is, indicate frequency bands that conflict and that are corresponding to the two MODEMs. Alternatively, the arbitration apparatus may also establish a complete table including the table of frequency bands that conflict and the table of frequency bands that do not conflict, that is, indicate frequency bands that do not conflict and frequency bands that conflict. This is not specifically limited herein.

507: If a conflict occurs, the arbitration apparatus determines to switch from the DSDA mode to the DSDS mode. The arbitration apparatus determines, according to Table 1, namely, the table of frequency bands that do not conflict, that the high frequency band corresponding to the MODEM 1 conflicts with the high frequency band corresponding to the MODEM 2.

508: The arbitration apparatus initiates a preemption request to the MODEM 2. For example, the arbitration apparatus initiates the preemption request based on a priority of the voice service performed on MODEM 1 and a priority of the data service performed on MODEM 2. The MODEM 1 performs the voice service, and the MODEM 2 performs the data service, and the priority of the voice service is higher than the priority of the data service. Therefore, the arbitration apparatus initiates the preemption request to the MODEM 2 instead of the MODEM 1.

509: The MODEM 2 releases a data service resource. In other words, the MODEM 2 no longer occupies the radio frequency device.

510: The MODEM 2 sends a preemption acknowledgment message to the arbitration apparatus. After locally releasing the data service resource and stopping using the radio frequency device, the MODEM 2 returns the preemption acknowledgment message to the arbitration apparatus.

511: The arbitration apparatus sends a frequency band update acknowledgment message to the MODEM 1. In other words, in this operation, the terminal switches from the DSDA mode to the DSDS mode, so that the service resource is preempted by the MODEM 1.

512: The MODEM 1 performs, based on the frequency band update acknowledgment message, transmission and reception. After receiving the frequency band update acknowledgment message, the MODEM 1 initiates an access and synchronization process in the target cell corresponding to the high frequency band. After the access and synchronization are successful, the MODEM 1 performs transmission and reception with a network by using the occupied radio frequency device, namely, the service resource.

In this embodiment of this application, when the MODEM 1 and the MODEM 2 are in the DSDA mode, the arbitration apparatus stores a correspondence table of capability configuration of radio frequency devices. The correspondence table may include at least one of the table of frequency bands that do not conflict and that are corresponding to the two MODEMs or the table of frequency bands that conflict and that are corresponding to the two MODEMs. The arbitration apparatus determines, according to the configured correspondence table, whether service resources used for the services on the two SIMs conflict. If the service resources used for the services on the two SIMs conflict, the arbitration apparatus may switch from the DSDA mode to the DSDS mode. This effectively utilizes the service resources.

2. A DSDA mode is maintained for services on two SIMs.

Figure 6:
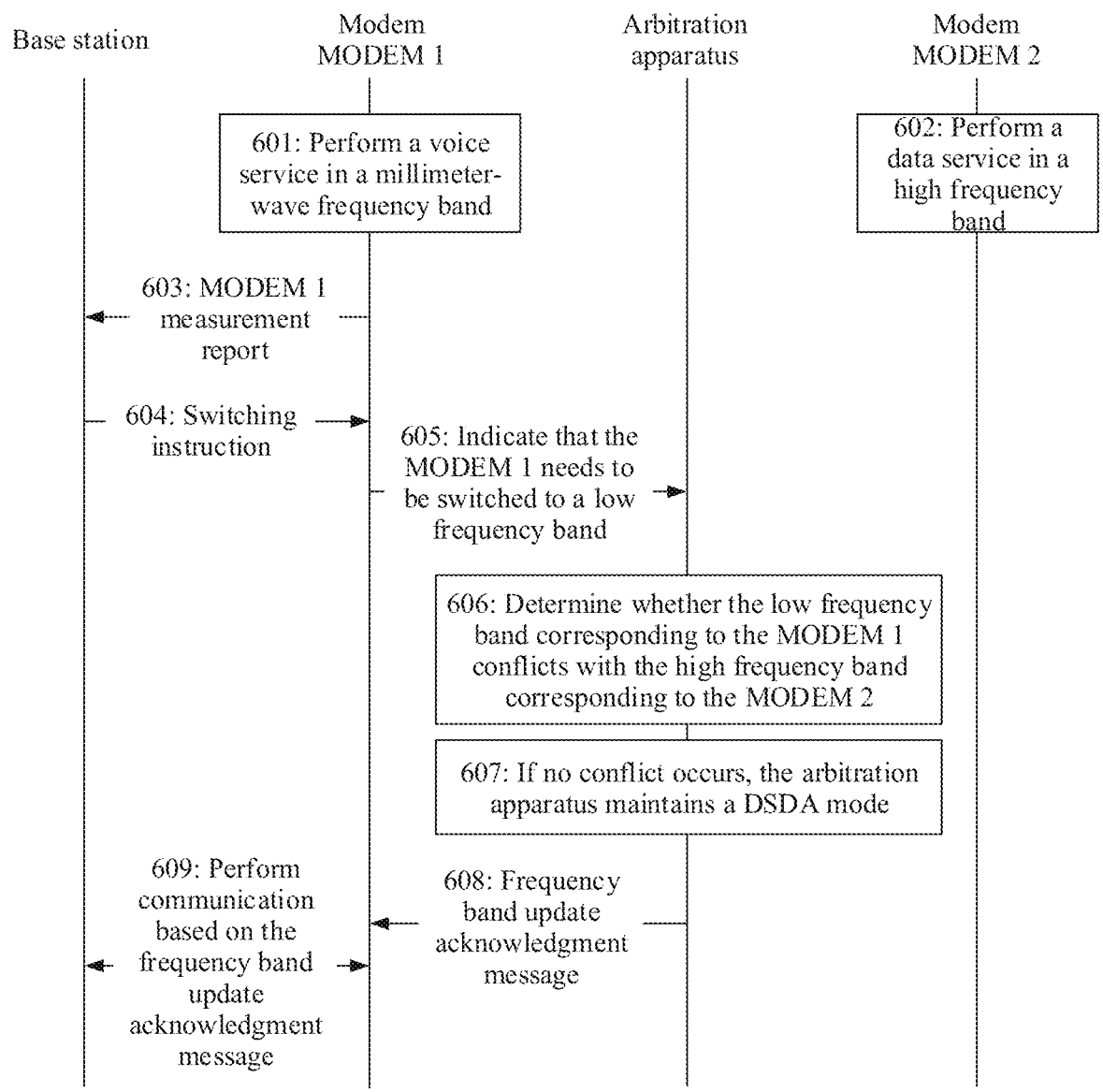
FIG. 6 is a schematic diagram of another method for performing a communication service by using a plurality of modems according to an embodiment of this application.

FIG. 6 is a schematic diagram of a method for performing a communication service by using a plurality of modems according to an embodiment of this application. 601: A first modem MODEM 1 performs a voice service in a millimeter-wave frequency band. 602: A second modem MODEM 2 performs a data service in a high frequency band. The MODEM 1 and the MODEM 2 are in the DSDA mode. 603: When a terminal moves, the MODEM 1 of the terminal sends a MODEM 1 measurement report to a base station. It should be noted that operations 601 to 603 are similar to operations 501 to 503 shown in FIG. 5. Details are not described herein again.

604: The MODEM 1 receives, from the base station, a switching instruction for a voice service, where the switching instruction is used to instruct the MODEM 1 to switch from the millimeter-wave frequency band to a low frequency band. For example, the base station sends the switching instruction for the voice service to the MODEM 1 based on the MODEM 1 measurement report. The switching instruction is used to instruct the MODEM 1 to switch from the millimeter-wave frequency band to a low frequency band. In other words, the switching instruction is used to instruct the MODEM 1 to switch from an original cell to a target cell.

605: The MODEM 1 indicates to the arbitration apparatus that the MODEM 1 needs to be switched to a low frequency band. For example, the MODEM 1 may send an indication message to the arbitration apparatus, where the indication message may indicate that the MODEM 1 needs to be switched to a low frequency band.

606: The arbitration apparatus determines whether a low frequency band corresponding to the MODEM 1 conflicts with the high frequency band corresponding to the MODEM 2. The arbitration apparatus determines, according to a preset correspondence table, whether the low frequency band corresponding to the MODEM 1 conflicts with the high frequency band corresponding to the MODEM 2. The preset correspondence table is described in operation 506 shown in FIG. 5. Details are not described herein again.

607: If no conflict occurs, the arbitration apparatus maintains the DSDA mode. If the arbitration apparatus determines that the low frequency band corresponding to the MODEM 1 does not conflict with the high frequency band corresponding to the MODEM 2, it indicates that the voice service on the MODEM 1 and the data service on the MODEM 2 can be performed concurrently. Then, the arbitration apparatus maintains the DSDA mode. In this case, the MODEM 1 operates in a low frequency band, and occupies a service resource corresponding to the low frequency band. The MODEM 2 operates in a high frequency band, and occupies a service resource corresponding to the high frequency band.

608: The arbitration apparatus sends a frequency band update acknowledgment message to the MODEM 1. In other words, the MODEM 1 is indicated to operate in a low frequency band.

609: The MODEM 1 performs, based on the frequency band update acknowledgment message, transmission and reception. After receiving the frequency band update acknowledgment message, the MODEM 1 initiates an access and synchronization process in the target cell corresponding to the low frequency band. After the access and synchronization are successful, the MODEM 1 performs transmission and reception with a network by using an occupied radio frequency device, namely, the service resource.

In this embodiment of this application, when the MODEM 1 and the MODEM 2 are in the DSDA mode, the arbitration apparatus stores a correspondence table of capability configuration of radio frequency devices. The correspondence table may include at least one of a table of frequency bands that do not conflict and that are corresponding to the two MODEMs or a table of frequency bands that conflict and that are corresponding to the two MODEMs. The arbitration apparatus determines, according to the configured correspondence table, whether service resources used for the services on the two SIMs conflict. If the service resources used for the services on the two SIMs do not conflict, the arbitration apparatus may maintain the DSDA mode. This ensures normal execution of the services on the two SIMs, and effectively utilizes the service resources.

3. A DSDS mode is switched to a DSDA mode for services on two SIMs.

Figure 7:
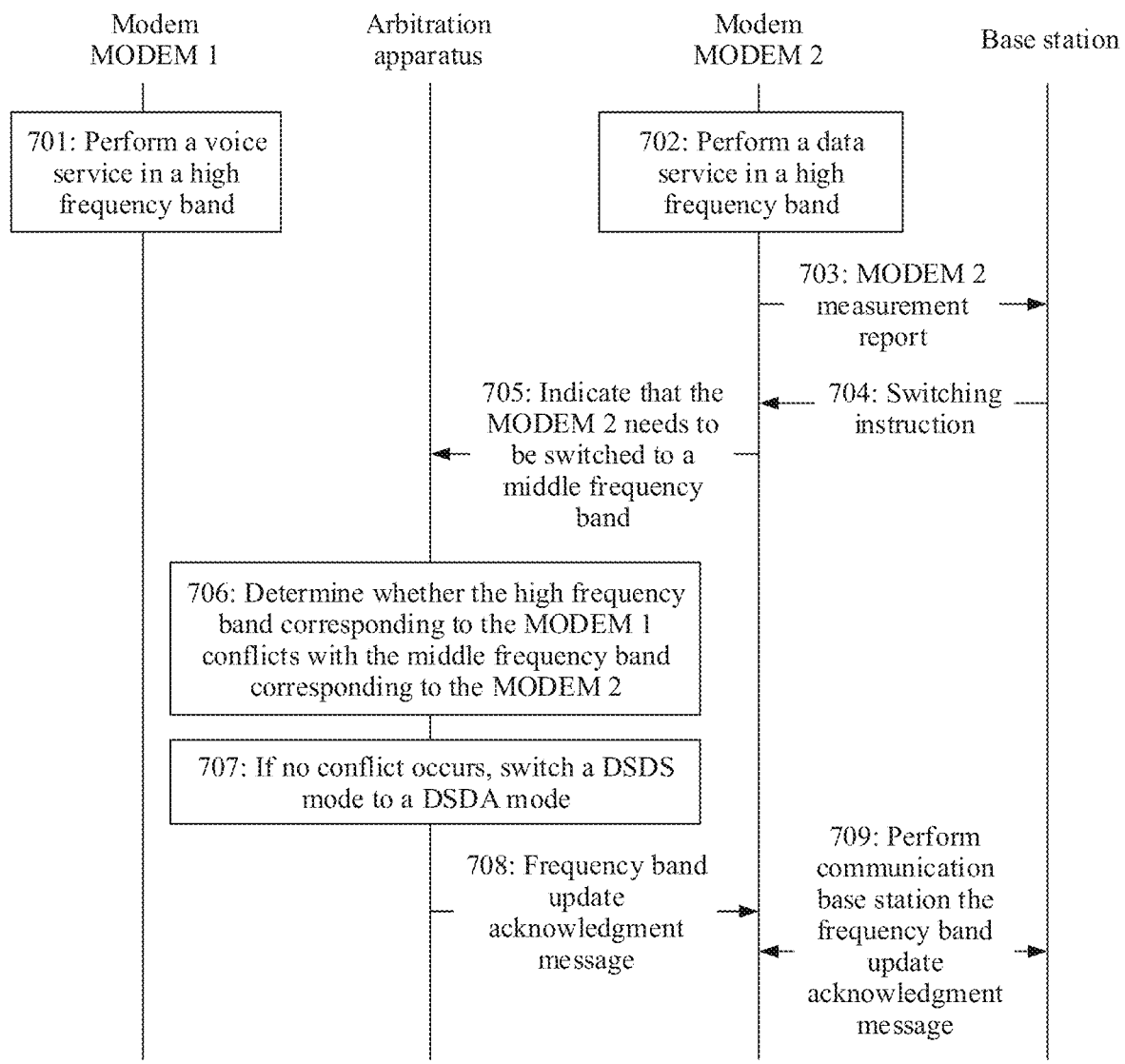
FIG. 7 is a schematic diagram of still another method for performing a communication service by using a plurality of modems according to an embodiment of this application.

FIG. 7 is a schematic diagram of a method for performing a communication service by using a plurality of modems according to an embodiment of this application. 701: A first modem MODEM 1 performs a voice service in a high frequency band. In this case, the MODEM 1 performs a communication service through transmission and reception in the high frequency band, and occupies a service resource corresponding to the high frequency band.

702: A second modem MODEM 2 performs a data service in a high frequency band. The MODEM 1 and the MODEM 2 are in the DSDS mode. For example, before the MODEM 2 performs the data service in the high frequency band, the MODEM 2 receives a data service request. For example, the MODEM 2 generates the data service request in response to an operation of the user, or the MODEM 2 receives the data service request sent by a software program or the like. Then, the MODEM 2 sends a data service resource request to an arbitration apparatus based on the data service request, where the data service resource request carries information about the high frequency band. The arbitration apparatus determines, based on the information about the high frequency band and according to a preset correspondence table, that the information about the high frequency band conflicts with information about a frequency band corresponding to another communication service on a terminal. In this case, the arbitration apparatus may initiate a preemption request based on priorities of services on the MODEM 1 and the MODEM 2. Because a priority of the voice service is higher than a priority of the data service, the arbitration apparatus releases a service resource of the MODEM 2, to ensure that the voice service on the MODEM 1 is performed normally. In this case, that the MODEM 2 performs the communication service is to wait for communication rather than perform sending and receiving. Therefore, the MODEM 2 does not occupy any service resource.

703: When the terminal moves, the MODEM 2 of the terminal sends a MODEM 2 measurement report to a base station. For example, when using the terminal, the user may move, and the MODEM 2 sends the MODEM 2 measurement report to the base station. It should be noted that the MODEM 1 of the terminal may also send a MODEM 1 measurement report to the base station. Herein, that the MODEM 2 sends the MODEM 2 measurement report to the base station is used as an example for description.

704: The MODEM 2 receives, from the base station, a switching instruction for the data service, where the switching instruction is used to instruct the MODEM 2 to switch from the high frequency band to a middle frequency band. For example, the base station sends the switching instruction for the data service to the MODEM 2 based on the MODEM 2 measurement report. The switching instruction is used to instruct the MODEM 2 to switch from the high frequency band to a middle frequency band. In other words, the switching instruction is used to instruct the MODEM 2 to switch from an original cell to a target cell.

705: The MODEM 2 indicates to the arbitration apparatus that the MODEM 2 needs to be switched to a middle frequency band. For example, the MODEM 2 may send an indication message to the arbitration apparatus, where the indication message may indicate that the MODEM 2 needs to be switched to a middle frequency band.

706: The arbitration apparatus determines whether the high frequency band corresponding to the MODEM 1 conflicts with the middle frequency band corresponding to the MODEM 2. The arbitration apparatus determines, according to the preset correspondence table, whether the high frequency band corresponding to the MODEM 1 conflict with the middle frequency band corresponding to the MODEM 2. The preset correspondence table is described in operation 506 shown in FIG. 5. Details are not described herein again.

707: If no conflict occurs, the arbitration apparatus switches from the DSDS mode to the DSDA mode. If the arbitration apparatus determines that the high frequency band corresponding to the MODEM 1 does not conflict with the middle frequency band corresponding to the MODEM 2, it indicates that the voice service on the MODEM 1 and the data service on the MODEM 2 can be performed concurrently. Then, the arbitration apparatus may switch from the DSDS mode to the DSDA mode. In this case, the arbitration apparatus may allocate, to the MODEM 2, a service resource corresponding to the middle frequency band. The MODEM 1 continues to use the service resource corresponding to the high frequency band. In this way, the two MODEMs can implement concurrent transmission.

708: The arbitration apparatus sends a frequency band update acknowledgment message to the MODEM 2. In other words, the MODEM 2 is indicated to operate in a middle frequency band.

709: The MODEM 2 performs, based on the frequency band update acknowledgment message, transmission and reception. After receiving the frequency band update acknowledgment message, the MODEM 2 initiates an access and synchronization process in the target cell corresponding to the middle frequency band. After the access and synchronization are successful, the MODEM 2 performs transmission and reception with a network by using an occupied radio frequency device, namely, the service resource.

In this embodiment of this application, when the MODEM 1 and the MODEM 2 are in the DSDS mode, the arbitration apparatus stores a correspondence table of capability configuration of radio frequency devices. The correspondence table may include at least one of a table of frequency bands that do not conflict and that are corresponding to the two MODEMs or a table of frequency bands that conflict and that are corresponding to the two MODEMs. The arbitration apparatus determines, according to the configured correspondence table, whether service resources used for the services on the two SIMs conflict. If the service resources used for the services on the two SIMs do not conflict, the arbitration apparatus may switch from the DSDS mode to the DSDA mode. This ensures normal execution of the services on the two SIMs, and effectively utilizes the service resources.

4. A DSDS mode is maintained for services on two SIMs.

Figure 8:
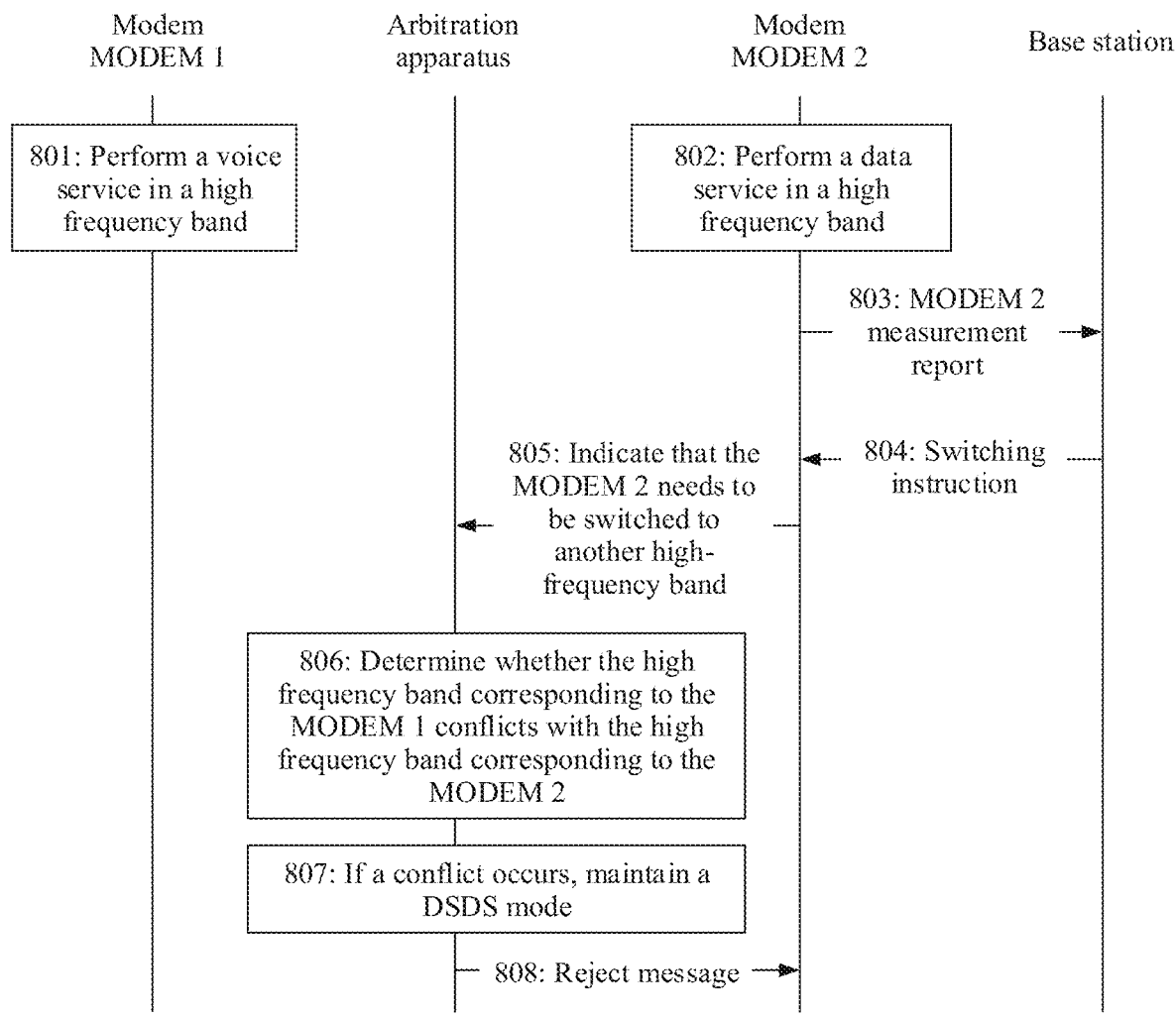
FIG. 8 is a schematic diagram of still yet another method for performing a communication service by using a plurality of modems according to an embodiment of this application.

FIG. 8 is a schematic diagram of a method for performing a communication service by using a plurality of modems according to an embodiment of this application. 801: A first modem MODEM 1 performs a voice service in a high frequency band. 802: A second modem MODEM 2 performs a data service in a high frequency band. The MODEM 1 and the MODEM 2 are in the DSDS mode. 803: When the terminal moves, the MODEM 2 of a terminal sends a MODEM 2 measurement report to a base station. It should be noted that operations 801 to 803 are similar to operations 701 to 703 shown in FIG. 7. Details are not described herein again.

804: The MODEM 2 receives, from the base station, a switching instruction for the data service, where the switching instruction is used to instruct the MODEM 2 to switch from the high frequency band to another high frequency band. For example, the base station sends the switching instruction for the data service to the MODEM 2 based on the MODEM 2 measurement report. The switching instruction is used to instruct the MODEM 2 to switch from the high frequency band to another high frequency band. In other words, although a cell handover occurs, carriers corresponding to an original cell from which the handover is performed and a target cell to which the handover is performed are both in the high frequency band.

805: The MODEM 2 indicates to the arbitration apparatus that the MODEM 2 needs to be switched to another high frequency band. For example, the MODEM 2 may send an indication message to the arbitration apparatus, where the indication message may indicate that the MODEM 2 needs to be switched to a high frequency band.

806: The arbitration apparatus determines whether the high frequency band corresponding to the MODEM 1 conflicts with the high frequency band corresponding to the MODEM 2. The arbitration apparatus determines, according to a preset correspondence table, whether the high frequency band corresponding to the MODEM 1 conflict with the high frequency band corresponding to the MODEM 2. The preset correspondence table is described in operation 506 shown in FIG. 5. Details are not described herein again.

807: If a conflict occurs, the arbitration apparatus maintains the DSDS mode. If the arbitration apparatus determines that the high frequency band corresponding to the MODEM 1 conflicts with the high frequency band of the MODEM 2, it indicates that the voice service on the MODEM 1 and the data service on the MODEM 2 cannot be performed concurrently. Then, the arbitration apparatus continues to maintain the DSDS mode. The MODEM 1 performs the voice service, and the MODEM 2 performs the data service, and the priority of the voice service is higher than the priority of the data service. Therefore, the arbitration apparatus ensures that the voice service is normally performed on the MODEM 1.

808: The arbitration apparatus sends a reject message to the MODEM 2. In this case, the arbitration apparatus rejects a resource request of the MODEM 2. In other words, the MODEM 2 still cannot use a service resource corresponding to the high frequency band. Therefore, the MODEM 2 is still in a status of waiting for sending and receiving and does not occupy a service resource. In this way, the DSDS mode is maintained.

In this embodiment of this application, when the MODEM 1 and the MODEM 2 are in the DSDS mode, the arbitration apparatus stores a correspondence table of capability configuration of radio frequency devices. The correspondence table may include at least one of a table of frequency bands that do not conflict and that are corresponding to the two MODEMs or a table of frequency bands that conflict and that are corresponding to the two MODEMs. The arbitration apparatus determines, according to the configured correspondence table, whether service resources used for the services on the two SIMs conflict. If the service resources used for the services on the two SIMs conflict, the arbitration apparatus may maintain the DSDS mode. This effectively utilizes the service resources.

In this embodiment of this application, the arbitration apparatus determines, based on current frequency bands in which the two MODEMs perform respective services, whether the two MODEMs currently operate in a DSDA mode or the DSDS mode, and performs switching flexibly. This improves utilization of service resources. It is assumed that the voice service of the MODEM 1 operates in a millimeter-wave frequency band, and the MODEM 2 needs to initiate a data service in a high frequency band. In this case, the arbitration apparatus determines that radio frequency front ends for the services on the two SIMs do not conflict with each other, and the voice service of the MODEM 1 and the data service of the MODEM 2 can be performed concurrently, that is, the dual SIM dual active mode. As the terminal moves, if the MODEM 1 is switched from the millimeter-wave frequency band to a high frequency band in non-millimeter-wave frequency bands to perform the voice service, the arbitration apparatus performs service preemption processing based on priorities of the services on the two SIMs. In this case, the arbitration apparatus switches from the dual SIM dual active mode to the dual SIM dual standby mode. In a DSDA and DSDS dynamic hybrid mode, the arbitration apparatus stores the correspondence table of the capability configuration of the radio frequency devices. The correspondence table may include at least one of the table of frequency bands that do not conflict and that are corresponding to the two MODEMs and the table of frequency bands that conflict and that are corresponding to the two MODEMs. The arbitration apparatus determines, according to the configured correspondence table, whether the radio frequency front ends used for the services on the two SIMs conflict, and determines, according to a conflict status, that the two SIMs enter the DSDA mode or the DSDS mode. This effectively utilizes the service resources.

It should be noted that the foregoing embodiment is described by using an example in which the MODEM 1 and the MODEM 2 respectively correspond to different SIM cards. However, in practice, a case in which one SIM card is used by a plurality of users is also applicable to a scenario of this embodiment of the present invention. For example, a user 1 and a user 2 using a SIM card may suffer service resource preemption mentioned above. Therefore, according to the corresponding solution, that the two MODEMs concurrently perform services, that is, perform at the same time, can be changed to that the two MODEMs cannot perform services at the same time. In this way, service resource preemption is implemented. Alternatively, reverse switching is implemented. Therefore, the foregoing embodiment is applicable to any application scenario in which that the two MODEMs concurrently perform services is changed to that the two MODEMs preempt service resources, to implement service execution by one of the MODEMs or reverse switching. For example, the application scenario includes switching between SGLTE (simultaneous GSM and LTE) and GSM or an LTE single mode, or switching between SVD (simultaneous voice and data) and a CDMA single mode. The embodiments of this application may also be applied to a multi-SIM terminal including a physical SIM and a virtual SIM.

In the foregoing embodiments, all or some of the modules shown in FIG. 4 may be implemented by software, hardware, firmware, or any combination thereof. When software is used to implement the embodiments, all or some of the embodiments may be implemented in a form of computer program product. The computer program product includes one or more computer instructions. When the computer program instructions are loaded and executed on a computer, the procedures or the functions according to the embodiments of this application completely or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the specification, claims, and accompanying drawings of this application, the terms "first", "second", "third", "fourth", and so on (if exist) are intended to distinguish between similar objects but do not necessarily indicate a specific order or sequence. It should be understood that the data used in such a way are interchangeable in proper circumstances so that the embodiments described herein may be implemented in other orders than the order illustrated or described herein. Moreover, the terms "include", "have" and any other variants mean to cover the nonexclusive inclusion, for example, a process, method, system, product, or device that includes a list of operations or units is not necessarily limited to those expressively listed units, but may include other units not expressly listed or inherent to such a process, method, system, product, or device.

The invention claimed is:

1. An apparatus for performing a communication service by using a plurality of modems, comprising:
    a first modem;
    a second modem; and
    an arbitration apparatus;
    wherein the first modem and the second modem multiplex a radio-frequency integrated circuit (RFIC);
    wherein the first modem is configured to perform a first communication service in a first frequency band;
    wherein the second modem is configured to perform a second communication service in a second frequency band;
    wherein an operating mode of each of the first modem and the second modem is switchable between a dual subscriber identification module (SIM) dual standby (DSDS) mode and dual SIM dual active (DSDA) mode depending on whether the first frequency band conflicts with the second frequency band.

2. The apparatus according to claim 1, wherein
    the arbitration apparatus, configured to determine whether the first frequency band conflicts with the second frequency band.

3. The apparatus according to claim 2, wherein the arbitration apparatus is further configured to:
    when it is determined that the first frequency band conflicts with the second frequency band, control the first modem and the second modem to switch to the DSDS mode.

4. The apparatus according to claim 2, wherein the arbitration apparatus is further configured to:
    when it is determined that the first frequency band does not conflict with the second frequency band, control each of the first modem and the second modem to switch to the DSDA mode.

5. The apparatus according to claim 2, further comprises:
    a memory, wherein the memory is to store a correspondence table used to indicate a frequency band conflict status between the first modem and the second modem; and
    wherein the arbitration apparatus is configured to determine whether the first frequency band conflicts with the second frequency band according to the correspondence table.

6. The apparatus according to claim 5, wherein the frequency band conflict status comprises:
    at least one of conflict frequency band information or non-conflict frequency band information of the first modem and the second modem.

7. The apparatus according to claim 1, wherein the first modem and the second modem in the DSDA mode use their respective radio frequency devices, wherein each radio frequency device comprises at least one of the RFIC, a radio frequency front end (RFFE), or an antenna.

8. The apparatus according to claim 7, wherein one of the first modem and the second modem uses a millimeter-wave radio frequency device, and the other modem uses a non-millimeter-wave radio frequency device.

9. The apparatus according to claim 1, wherein the first modem and the second modem in the DSDS mode use a same radio frequency device in a preemption manner, wherein each radio frequency device comprises at least one of the RFIC, a radio frequency front end (RFFE), or an antenna.

10. The apparatus according to claim 1, wherein the first modem and the second modem are integrated in a chip with an application processor.

* * * * *